United States Patent
Tomita et al.

(10) Patent No.: US 6,230,324 B1
(45) Date of Patent: *May 8, 2001

(54) DEVICE FOR TRANSMITTING BROADCAST-PROGRAM INFORMATION AND ALLOWING OTHER INFORMATION SOURCES TO BE ACCESSED

(75) Inventors: Yasumasa Tomita; Shigeru Oizumi, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/840,155

(22) Filed: Apr. 11, 1997

(30) Foreign Application Priority Data

May 27, 1996 (JP) .................................................. 8-131725

(51) Int. Cl.⁷ .................................................. G06F 13/00

(52) U.S. Cl. ........................... 725/51; 345/501; 345/513; 725/54

(58) Field of Search .................................. 348/7, 12, 906, 348/531–537; 345/327; 707/513, 102, 501, 531, 540

(56) References Cited

U.S. PATENT DOCUMENTS

| 4,567,512 | 1/1986 | Abraham . |
| 4,706,121 | 11/1987 | Young .................................. 358/142 |
| 5,014,125 | 5/1991 | Pocock et al. . |

(List continued on next page.)

FOREIGN PATENT DOCUMENTS

| 5-022672 | 1/1993 | (JP) . |
| 5-22673 | 1/1993 | (JP) . |
| 5-083688 | 4/1993 | (JP) . |
| 5-284478 | 10/1993 | (JP) . |
| 5-284480 | 10/1993 | (JP) . |
| 5-284481 | 10/1993 | (JP) . |
| 6-030411 | 2/1994 | (JP) . |
| 7-147657 | 6/1995 | (JP) . |
| 7-193762 | 7/1995 | (JP) . |
| 8-036605 | 2/1996 | (JP) . |

OTHER PUBLICATIONS

Internet newsgroups article 31555 of comp.infosystems.www.authorig.html, Oct. 1995.*

Web Site of TV Tokyo (HTML document at http://www.tv–tkyo.co.jp/) posted in Apr. 1996 (along with translation).

Web Site of TV Asashi (HTML document at http://www.tv–asashi.co.jp/) posted in Apr. 1996 (along with translation).

(List continued on next page.)

Primary Examiner—Nathan Flynn
(74) Attorney, Agent, or Firm—Staas & Halsey LLP

(57) ABSTRACT

A device sends broadcast-program information to a plurality of terminal devices connected via a network so that the plurality of terminal devices display the broadcast-program information on display screens. The device includes a keyword management unit storing correspondence between keywords and addresses of information sources which provide information relevant to the keywords, a check unit checking whether broadcast-program information to be sent to a terminal device contains the keywords, and an addition unit attaching an access button to each of the keywords found in the broadcast-program information by looking up the correspondence stored in the keyword management unit so that the access button specifies an address of a corresponding one of the information sources. The access button is used in the terminal device for accessing the corresponding one of the information sources.

15 Claims, 23 Drawing Sheets

U.S. PATENT DOCUMENTS

| | | | |
|---|---|---|---|
| 5,151,789 | 9/1992 | Young | 358/194.1 |
| 5,353,121 | 10/1994 | Young et al. | 348/563 |
| 5,465,385 | 11/1995 | Ohga et al. . | |
| 5,479,266 | 12/1995 | Young et al. | 358/335 |
| 5,479,268 | 12/1995 | Young et al. | 358/335 |
| 5,491,760 | 2/1996 | Withgott et al. . | |
| 5,532,754 | 7/1996 | Young et al. | 348/569 |
| 5,585,838 | 12/1996 | Lawler et al. . | |
| 5,592,551 | 1/1997 | Lett et al. . | |
| 5,619,249 | 4/1997 | Billock et al. . | |
| 5,623,613 | 4/1997 | Rowe et al. . | |
| 5,657,072 | 8/1997 | Aristides et al. . | |
| 5,671,411 | 9/1997 | Watts et al. . | |
| 5,686,954 | 11/1997 | Yoshinobu et al. . | |
| 5,699,107 * | 12/1997 | Lawler et al. | 348/906 X |
| 5,701,451 | 12/1997 | Rogers et al. . | |
| 5,721,827 | 2/1998 | Logan et al. . | |
| 5,732,216 | 3/1998 | Logan et al. . | |
| 5,748,493 | 5/1998 | Lightfoot et al. . | |
| 5,751,282 | 5/1998 | Girard et al. . | |
| 5,761,606 | 6/1998 | Wolzien . | |
| 5,774,664 | 6/1998 | Hidary et al. . | |
| 5,778,181 | 7/1998 | Hidary et al. . | |
| 5,790,172 | 8/1998 | Imanaka . | |
| 5,797,001 | 8/1998 | Augenbraun et al. . | |
| 5,818,438 | 10/1998 | Howe et al. . | |
| 5,822,539 * | 10/1998 | Van Hoff | 395/200.66 |
| 5,828,403 | 10/1998 | DeRodeff et al. . | |
| 5,835,843 | 11/1998 | Haddad . | |
| 5,880,768 | 3/1999 | Lemmons et al. . | |
| 5,914,712 | 6/1999 | Sartain et al. . | |
| 5,945,987 | 8/1999 | Dunn . | |

OTHER PUBLICATIONS

Web Site of Nihon TV (HTML document at http://www.ntv-.co.jp/) posted in Apr. 1996 (along with translation).

Web Site of NHK (HTML document at http://www.nhk.or,jp/) posted in Apr. 1996 (along with translation).

Web Site of MX TV (HTML document at http://www.mx-tv.co.jp/) posted in Apr. 1996 (along with translation).

Web Site of TBS (HTML document at http://www.tbs.co.jp/) posted in Apr. 1996 (along with translation).

U.S. application No. 08/827,717, Tomita et al., filed Nov. 21, 1996.

U.S. application No. 08/838,922, Tomita et al., filed Apr. 8, 1997.

U.S. application No. 08/755,763, Okawa et al., filed Nov. 21, 1996.

* cited by examiner

FIG.5

NNK, http://www.nnk.or.jp/

TV ANTARCTIC, http://www.tv-soupo.co.jp/

∫

TBB, http://www.tbb.co.jp/

NEWS 23, http://www.tbb.co.jp/news23/

∫

MARRIAGE, http://www.bridal.or.jp/

PROFILE MANAGEMENT

| CHANNEL SETTINGS | | OTHER SETTINGS |
|---|---|---|
| 1 NNK (1 ch) | | CUSTOMIZED CATEGORY |
| 2 NNK EDUCATION (3 ch) | | CUSTOMIZED TIME |
| 3 EAST-WEST TV (4 ch) | | START-UP SCREEN |
| 4 TBB (6 ch) | STANDARD ~60 | |
| 5 SOUTH-NORTH TV (8 ch) | CHANGE ~61 | CHANGE ~62 |
| 6 TV ARCTIC (10 ch) | | |
| 7 TV ANTARCTIC (12 ch) | | |

PASSWORD SETTING

CHANGE ~63

OK    CANCEL

FIG.11

| CHANNEL-NUMBER SETTING | 1 | 2 | 3 | 4 | 5 | 6 | 7 | 8 | 9 | 10 | 11 | 12 |
|---|---|---|---|---|---|---|---|---|---|---|---|---|
| NNK | ○ | ○ | ○ | ○ | ○ | ○ | ○ | ○ | ○ | ○ | ○ | ○ |
| NNK EDUCATION | ○ | ○ | ○ | ○ | ○ | ○ | ○ | ○ | ○ | ○ | ○ | ○ |
| EAST-WEST TV | ○ | ○ | ○ | ○ | ○ | ○ | ○ | ○ | ○ | ○ | ○ | ○ |
| TBB | ○ | ○ | ○ | ○ | ○ | ○ | ○ | ○ | ○ | ○ | ○ | ○ |
| SOUTH-NORTH TV | ○ | ○ | ○ | ○ | ○ | ○ | ○ | ○ | ○ | ○ | ○ | ○ |
| TV ARCTIC | ○ | ○ | ○ | ○ | ○ | ○ | ○ | ○ | ○ | ○ | ○ | ○ |
| TV ANTARCTIC | ○ | ○ | ○ | ○ | ○ | ○ | ○ | ○ | ○ | ○ | ○ | ○ |

[NEXT SETTING] [RESET] [CANCEL] [RETURN]

FIG.12

CHANNEL-ORDER SETTING
TELEVISION STATION WITH NO CHANNEL-ORDER SETTING
WILL NOT APPEAR ON LISTING

| | | | | | | | | |
|---|---|---|---|---|---|---|---|---|
| NNK | 1ch | ○1 | ○2 | ○3 | ○4 | ○5 | ○6 | ○7 |
| NNK EDUCATION | 3ch | ○1 | ○2 | ○3 | ○4 | ○5 | ○6 | ○7 |
| EAST-WEST TV | 4ch | ○1 | ○2 | ○3 | ○4 | ○5 | ○6 | ○7 |
| TBB | 6ch | ○1 | ○2 | ○3 | ○4 | ○5 | ○6 | ○7 |
| SOUTH-NORTH TV | 8ch | ○1 | ○2 | ○3 | ○4 | ○5 | ○6 | ○7 |
| TV ARCTIC | 10ch | ○1 | ○2 | ○3 | ○4 | ○5 | ○6 | ○7 |
| TV ANTARCTIC | 12ch | ○1 | ○2 | ○3 | ○4 | ○5 | ○6 | ○7 |

[RESET] [CANCEL] [RETURN]

FIG.13

OTHER SETTINGS

CUSTOMIZED CATEGORY
☐ MOVIE  ☐ DRAMA  ☐ DOCUMENTARY
☐ MUSIC  ☐ SPORTS  ☐ VARIETY
☐ NEWS  ☐ EDUCATIONAL  ☐ OTHERS

CUSTOMIZED TIME
☐ : ☐ ~ ☐ : ☐

START UP SCREEN
○ MAIN MENU  ○ LISTING OF PROGRAMS  ○ CUSTOMIZED LISTING OF PROGRAMS
○ SPECIAL COVERAGE

[NEXT SETTING] [RESET] [CANCEL] [RETURN]

FIG.14

SETTING PASSWORD

USER ID  XX XXXXX XX

CURRENT PASSWORD

NEW PASSWORD

NEW PASSWORD (PLEASE ENTER IT AGAIN)

OK

CANCEL

FIG.16

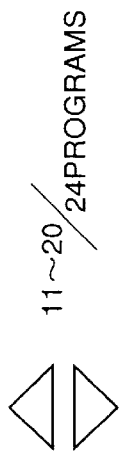

| 11~20/24PROGRAMS | | | RETURN |
|---|---|---|---|
| 22(MON.) 13:00 (30) | TBB | CHICKS' ANGEL | S |
| 22(MON.) 13:00 (90) | TV ANTARCTIC | MOVIE "BLACK TULIP" | |
| 22(MON.) 13:30 (30) | TBB | I'M A GROWN UP! | S |
| 22(MON.) 13:30 (30) | SOUTH-NORTH TV | EXPECTATION OF HAPPINESS | S |
| 22(MON.) 14:05 (30) | NNK | Ms. REIKO'S DENTIST | C, R, B |
| 22(MON.) 15:10 (50) | NNK | FRIENDS | C, R |
| 22(MON.) 16:00 (60) | TBB | CUT EDO TOWN WITH OUR SWORD | R |
| 22(MON.) 16:30 (60) | EAST-WEST TV | A HOMELESS CHILD | R,S |
| 22(MON.) 16:30 (60) | SOUTH-NORTH TV | MAY LOVE BE WITH US! | R,S |
| 22(MON.) 17:00 (60) | TBB | REASONS WHY I BORROWED MONEY FROM HER | R,S |

S : STEREO
C : CAPTION
R : RE-RUN
B : BILINGUAL

FIG.17

PROGRAM SEARCH

SEARCH SPAN  ○ TODAY  ○ UP TO TOMORROW  ○ THIS WEEK
  ○ UP TO YESTERDAY  ○ LAST WEEK

TIME SLOT  ☐ : ☐ ~ ☐ : ☐

CATEGORY  ☐ MOVIE  ☐ DRAMA  ☐ SPORTS  ☐ OTHER
  ☐ NNK  ☐ NNK EDUCATION  ☐ EAST-WEST TV  ☐ TBB
  ☐ SOUTH-NORTH TV  ☐ TV ARCTIC  ☐ TV ANTARCTIC

SEARCH RESULT SUMMARY  ○ DISPLAY  ○ DO NOT DISPLAY

[SEARCH]  [CANCEL]

FIG.18

DETAILED PROGRAM GUIDE

MONDAY DRAMA SPECIAL
NEW-YEAR SELECTION OF MYSTERY DRAMA
I'LL KEEP YOUR SAFETY IN MIND

[TBB] 1/22 (MON.) 21:00 ~ 22:54

PLAY SCRIPT : BURYU ISHIHARA

CAST : YOUKO NOGIWA, SHOWKO NOMURA, JUN MIHO, KUMIKO FUJIYOSHI, YASUHIRO ARAI, SANJI OJIMA, KYOUZOU NAGATSUKA, AND OTHERS

Nana(NOGIWA) is a lady manager who runs a pawn shop in an old traditional district of Tokyo. A regular customer, Fukunishi(NAGATSUKA), seems to fancy her. He is a lawyer, and enjoys playing a manager of a neighborhood-kid baseball team. A team-member kid, Yusuke(OHBA), lives with his mother, Katsue(FUJIYOSHI). One day Katsue receives an unexpected call from her missing husband, Tatsuya(ARAI), who says he will get killed unless she prepares ransom.

[RETURN]

(PICTURE)

```
<HTML>
<A HREF=" http://www.nnk.
or.jp/">NNK</A><P>
14 : 00~14 : 35<P>
Ms. REIKO'S DENTIST<P>
```

NNK

14 : 00~14 : 35

Ms. REIKO'S DENTIST

NNK [BILINGUAL] [CAPTION] [RE-RUN]
14:00 ~ 14:35
Ms.REIKO'S DENTIST

TODAY'S STORY
~ GETS MARRIED WITH ~ ...

| 11 (木)<br>(THURS.) | 14:00 | 15:00 |
|---|---|---|
| NNK | Ms.REIKO'S DENTIST 50 | |
| TBB | SUPERWIDE | SUPERWIDE |

```
<HTML>
NNK<P>
14:00~14:35<P>
Ms. REIKO'S DENTIST<P>
```

```
NNK
14:00~14:35
Ms. REIKO'S DENTIST
```

DEVICE FOR TRANSMITTING BROADCAST-PROGRAM INFORMATION AND ALLOWING OTHER INFORMATION SOURCES TO BE ACCESSED

CROSS-REFERENCE TO RELATED APPLICATIONS

This application is assigned in common with and is filed by the same inventors as the following related U.S. patent applications: Ser. No. 08/827,717, filed Apr. 8, 1997 now U.S. Pat. No. 6,100,884; and Ser. No. 08/838,922, filed Apr. 11, 1997.

BACKGROUND OF THE INVENTION

1. Field of the Invention

The present invention generally relates to an information transmission device which transmits information to a plurality of terminal devices connected via a network or the like so as to display the information on display screens of the terminal devices. Further, the present invention generally relates to a broadcast-program-listing transmission device which transmits listings of broadcast programs or program-information guides to a plurality of terminal devices connected via a network or the like so as to show the listings of broadcast programs or the program-information guides on display screens of the terminal devices. The present invention particularly relates to an information processing device and a broadcast-program-listing transmission device which allow a user of a terminal device to readily obtain necessary information on the display.

2. Description of the Related Art

A listing of broadcast programs for television or the radio has been typically distributed to households by means of paper media such as newspapers. Progress in the use of networks such as the Internet, however, has made it possible to distribute a listing of broadcast programs via a network.

Conventionally, a listing of broadcast programs is transmitted via a network as follows. A service company affiliated with a broadcast station keeps listings of broadcast programs aired by this broadcast station in files by using the same format as display format. Upon a request from a terminal device connected via a network, requested listings of broadcast programs are extracted from the files and sent to the terminal device via the network.

Upon receiving the listings of broadcast programs, the terminal device displays a listing on the display screen. This displayed listing of broadcast programs has a fixed format, and the broadcast programs may be shown for the time span of one week with respect to given time slots, for example. By turning pages on the display screen, a user can search for a desired listing of broadcast programs so as to obtain necessary information on the display screen.

In general, the terminal device is not a device specifically designed for the purpose of accessing a listing of broadcast programs, but is merely a general-purpose terminal which is capable of being connected to a network. With such a configuration, the terminal device can only display a received listing of broadcast programs. If the user wishes to obtain further information on broadcast programs, the user has to refer to other information sources such as newspapers or magazines. Even if such information sources are accessible through the network, the user has to go through the steps of finding an address of a relevant information source and typing in the address to access the information source.

Moreover, while looking though a listing of television programs, the user may come across information which the user wishes to know more about. In such a case, the user may find difficulties in finding a relevant information source itself or an address of a relevant information source.

Accordingly, there is a need for an information processing device or a broadcast-program-listing transmission device which allows a user to readily obtain necessary information when such a device is used for transmitting information such as listings of broadcast programs to a plurality of terminal devices connected via a network to show this information on display screens of these terminal devices.

SUMMARY OF THE INVENTION

Accordingly, it is a general object of the present invention to provide an information processing device or a broadcast-program-listing transmission device which satisfy the need described above.

It is another and more specific object of the present invention to provide an information processing device or a broadcast-program-listing transmission device which allows a user to readily obtain necessary information when such a device is used for transmitting information such as listings of broadcast programs to a plurality of terminal devices connected via a network to show this information on display screens of these terminal devices.

In order to achieve the above objects according to the present invention, a device for sending broadcast-program information to a plurality of terminal devices connected via a network so that the plurality of terminal devices display the broadcast-program information on display screens thereof includes a keyword management unit storing correspondence between keywords and addresses of information sources which provide information relevant to the keywords, a check unit checking whether broadcast-program information to be sent to a terminal device contains the keywords, and an addition unit attaching an access button to each of the keywords found in the broadcast-program information by looking up the correspondence stored in the keyword management unit so that the access button specifies an address of a corresponding one of the information sources, the access button being used in the terminal device for accessing the corresponding one of the information sources.

In the device described above, the broadcast-program information is sent to the terminal device, and is displayed on a display screen of the terminal device. While looking through this broadcast-program information displayed on the screen, a user of the terminal device can operate a button associated with a keyword so as to access an information source relevant to this keyword. That is, according to the present invention, while receiving information services from a given information providing system, a user can readily obtain information from other information providing systems as such information becomes necessary.

Other objects and further features of the present invention will be apparent from the following detailed description when read in conjunction with the accompanying drawings.

BRIEF DESCRIPTION OF THE DRAWINGS

FIG. 5 is an illustrative drawing showing an example of data stored in keyword database of FIG. 2;

FIG. 9 is an illustrative drawing showing an example of an initial-setting screen;

FIG. 11 is an illustrative drawing showing an example of a channel setting screen;

FIG. 12 is an illustrative drawing showing an example of a channel-order setting screen;

FIG. 13 is an illustrative drawing showing an example of a setting screen;

FIG. 14 is an illustrative drawing showing an example of a password setting screen;

FIG. 16 is an illustrative drawing showing an example of a listing of drama programs;

FIG. 17 is an illustrative drawing showing an example of a search-condition setting screen;

FIG. 18 is an illustrative drawing showing an example of a program-guide screen;

DESCRIPTION OF THE PREFERRED EMBODIMENTS

In the following, a principle and embodiments of the present invention will be described with reference to the accompanying drawings.

Figure 1:
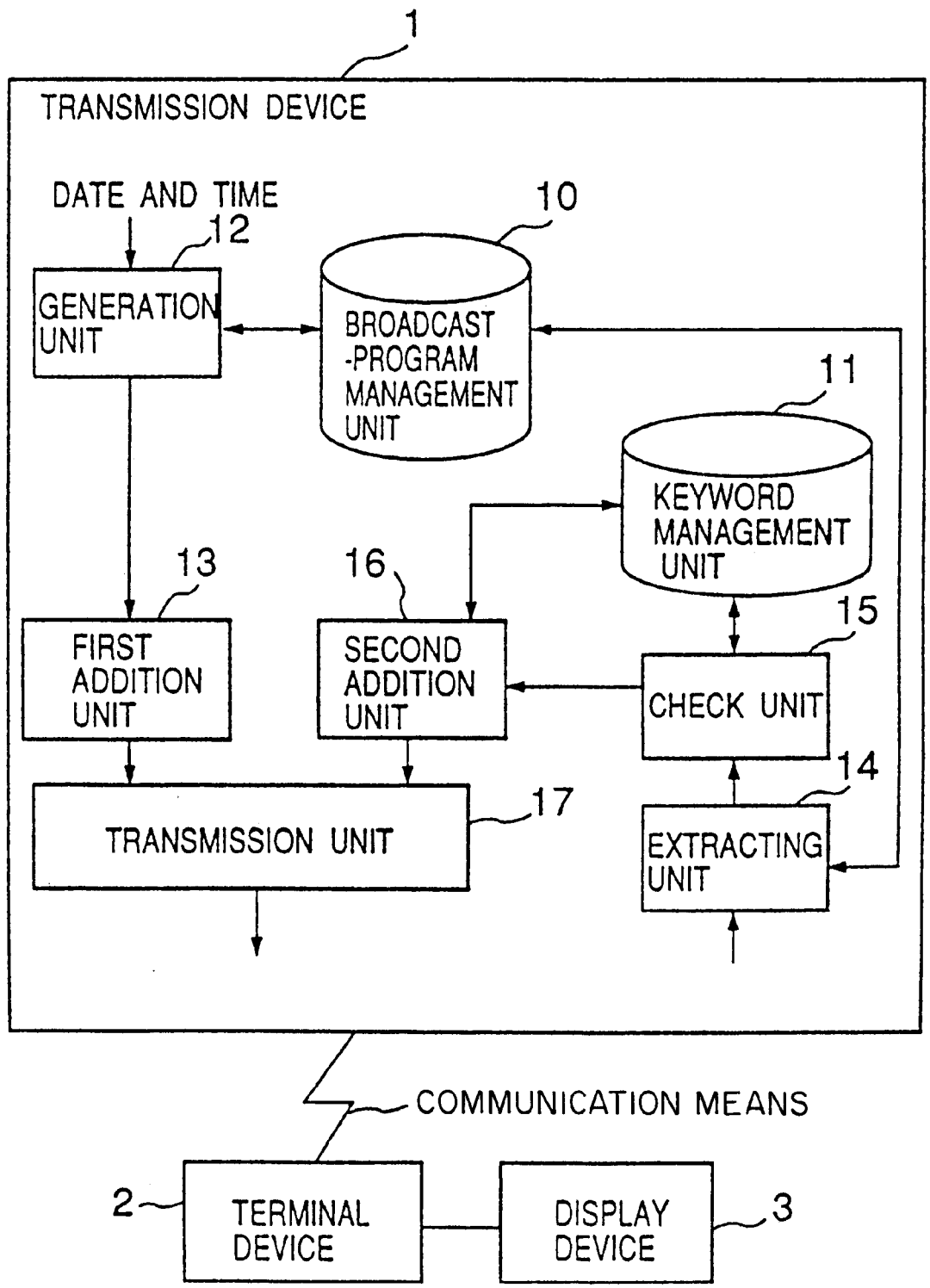
FIG. 1 is a block diagram of a broadcast-program-listing transmission device according to a principle of the present invention shown along with other elements constituting an entire system.

FIG. 1 is a block diagram of a broadcast-program-listing transmission device according to a principle of the present invention shown along with other elements constituting an entire system.

In FIG. 1, a broadcast-program-listing transmission device 1 is connected to a terminal device 2 via a communication means or network such as the Internet. The terminal device 2 is provided with a display device 3.

The broadcast-program-listing transmission device 1 of FIG. 1 displays a listing of broadcast programs or program-guide information on a display screen of the display device 3 by transmitting the listing or the information to the terminal device 2.

The broadcast-program-listing transmission device 1 includes a broadcast-program management unit 10, a keyword management unit 11, a generation unit 12, a first addition unit 13, an extracting unit 14, a check unit 15, a second addition unit 16, and a transmission unit 17.

The broadcast-program management unit 10 keeps and manages information about broadcast programs of a plurality of broadcast stations in a random-list format. The keyword management unit 11 stores and manages one-to-one relationships between keywords and addresses of information sources which provide information matching the keywords.

The generation unit 12 reads information about broadcast programs from the broadcast-program management unit 10 with respect to a date and time indicated by the terminal device 2, and edits the information to generate a listing of broadcast programs which is to be transmitted to the terminal device 2.

The first addition unit 13 attaches shift buttons to all or part of the broadcast programs contained in the listing of broadcast programs which is generated by the generation unit 12. The shift buttons are used for giving an instruction to display program-guide information on respective broadcast programs. The extracting unit 14 extracts program-guide information on a requested program from the broadcast-program management unit 10.

The check unit 15 checks whether the program-guide information extracted by the extracting unit 14 contains any keywords stored in the keyword management unit 11. The second addition unit 16 attaches an address of a relevant information source to the program-guide information extracted by the extracting unit 14. The transmission unit 17 sends the listing of broadcast programs or the program-guide information to the terminal device 2.

In the transmission device 1 having the configuration described above, upon activation from the terminal device 2 indicating a date and time, the generation unit 12 reads broadcast-program information of an indicated date and time from the broadcast-program management unit 10, and edits the broadcast-program information into a listing format to create a listing of broadcast programs. The first addition unit 13 attaches the shift buttons to the listing of broadcast programs, and the transmission unit 17 sends the listing of broadcast programs with the attached shift buttons to the terminal device 2 which made a request.

Upon receiving the listing of broadcast programs, the terminal device 2 displays the listing of broadcast programs including the shift buttons on the display device 3.

While the listing of broadcast programs is displayed on the display device 3, the terminal device 2 may issue a request via a shift button to display program-guide information on a particular broadcast program. In response, the extracting unit 14 extracts requested program-guide information from the broadcast-program management unit 10. The check unit 15 checks whether the program-guide information extracted by the extracting unit 14 contains any keywords stored in the keyword management unit 11.

If the check unit 15 finds such a keyword, the second addition unit 16 identifies an address of an information source which matches this keyword in the keyword management unit 11, and attaches this address to the keyword in the program-guide information which is extracted by the extracting unit 14. The transmission unit 17 sends to the terminal device 2 the program-guide information which includes keywords with respective addresses of information sources.

Upon receiving the program-guide information, the terminal device 2 displays the program-guide information including keywords with respective addresses of information sources on the display device 3. When a user wishes to obtain some information regarding a keyword shown on the display device 3, the user clicks the keyword to access a relevant information source whose address is attached to the clicked keyword.

As described above, while looking through program-guide information provided from a given information source, the user may wish to access information from another information source. In such a case, the user using the transmission device 1 according to the present invention can readily obtain the necessary information.

The transmission device 1 according to the present invention automatically attaches addresses of information sources to keywords in program-guide information before sending the program-guide information to the terminal device 2. Because of this, no extra burden is imposed on the user.

The above-description has been provided by taking an example in which program-guide information has keywords to which the transmission device 1 attaches addresses of information sources. Alternately, keywords in a listing of broadcast programs may be provided with respective addresses of information sources.

In what follows, embodiments of the present invention will be described with reference to the accompanying drawings.

Figure 2:
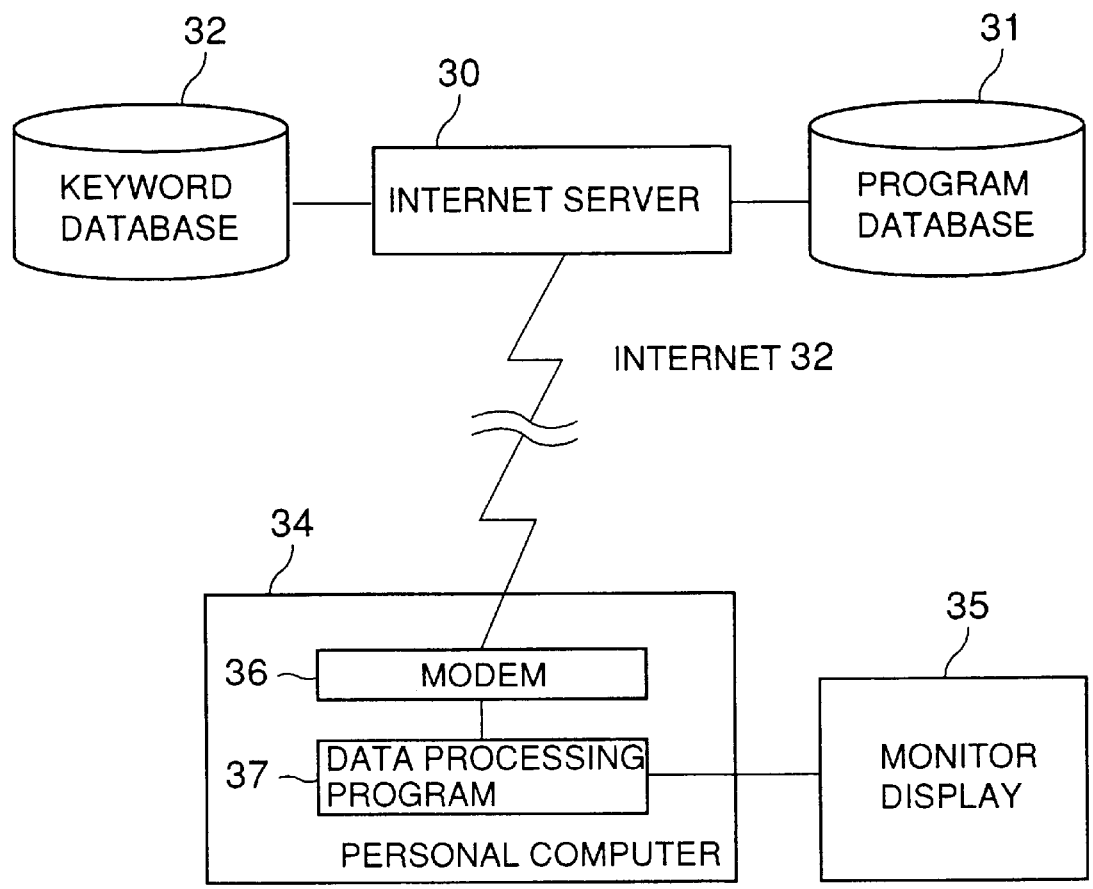
FIG. 2 is a block diagram of an embodiment of a network system according to the present invention.

FIG. 2 is a block diagram of an embodiment of a network system according to the present invention. In FIG. 2, the network system includes an internet server 30, a program database 31 provided for the internet server 30, a keyword database 32 provided for the internet server 30, an Internet 33, a personal computer 34, and a monitor display 35. Here, the Internet is merely used as an example for explanation, and any types of networks may be used in place of the Internet in the present invention.

Figure 3:
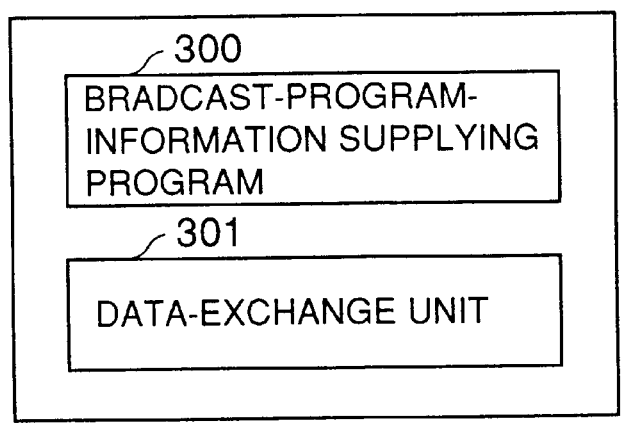
FIG. 3 is a block diagram of the internet server of FIG. 2.

FIG. 3 is a block diagram of the internet server 30 of FIG. 2. The internet server 30 of FIG. 3 includes a broadcast-program-information supplying program 300 and a data-exchange unit 301.

The internet server 30 according to the present invention is connected to the Internet 33. The internet server 30 is provided with the broadcast-program-information supplying program 300 for supplying information on television programs, and is provided with the data-exchange unit 301 for conducting data exchange with the personal computer 34. Via the Internet 33, the internet server 30 delivers a listing of television programs to the personal computer 34.

As shown in FIG. 2, the personal computer 34 includes a modem 36 and a data processing program 37. The personal computer 34 uses the modem 36 to receive a listing of television programs from the internet server 30, and uses the data processing program 37 to display the listing of television programs on the monitor display 35.

Figure 4:
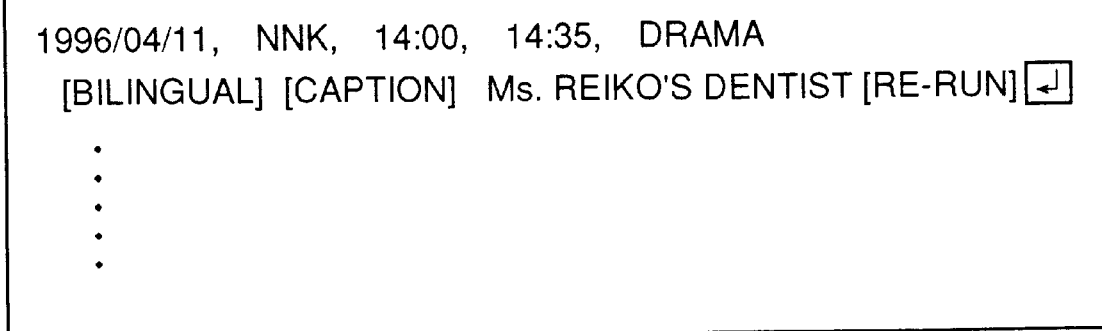
FIG. 4 is an illustrative drawing showing an example of television-program information stored in the program database of FIG. 2.

The broadcast-program-information supplying program 300 of the internet server 30 supplies information about television programs by using television-program information stored in the program database 31. To this end, the program database 31 stores television-program information (an aired or broadcast date, a name of a television station, an aired or broadcast time, a category of a television program, a title of the television program, a program guide, etc.) with respect to each television station in a random-list format. FIG. 4 is an illustrative drawing showing an example of the television-program information stored in the program database 31.

Since the program database 31 keeps the television-program information in a random-list format rather than in a table format, the contents of the information can be easily modified. An administrator of the program database 31 is thus able to make an amendment promptly and readily to the information in the program database 31 when there is a change of schedules or contents to the television programs.

Further, the broadcast-program-information supplying program 300 has a configuration which enables access to other information sources connected via the Internet 33 while a listing of television programs is displayed. This is achieved by using data in the keyword database 32. To this end, the keyword database 32 keeps one-to-one relationships between keywords and URLs of information sources which provide information relating to the keywords. Here, URL is a symbol which indicates a location of an information source in the Internet 33. FIG. 5 is an illustrative drawing showing an example of data stored in the keyword database 32.

The keywords stored in the keyword database 32 are not limited to those relating to television programs, but can be any keywords as long as these keywords are likely to draw user interest. FIG. 5 shows an example in which a keyword "marriage" is included despite a lack of direct connection to television programs among other directly related keywords such as television-station names "NNK", "TELEVISION ANTARCTIC", and "TBB" and a television-program name "NEWS 23". The keyword "marriage" is associated with an information source having a URL of "http://www.bridal/.or.jp/". This information source may be an agent that provides information on places for conducting a wedding ceremony.

Data registration to the terminal device 2 may be carried out by an administrator of the program database 31, or may be carried out by any other staff.

Figure 6:
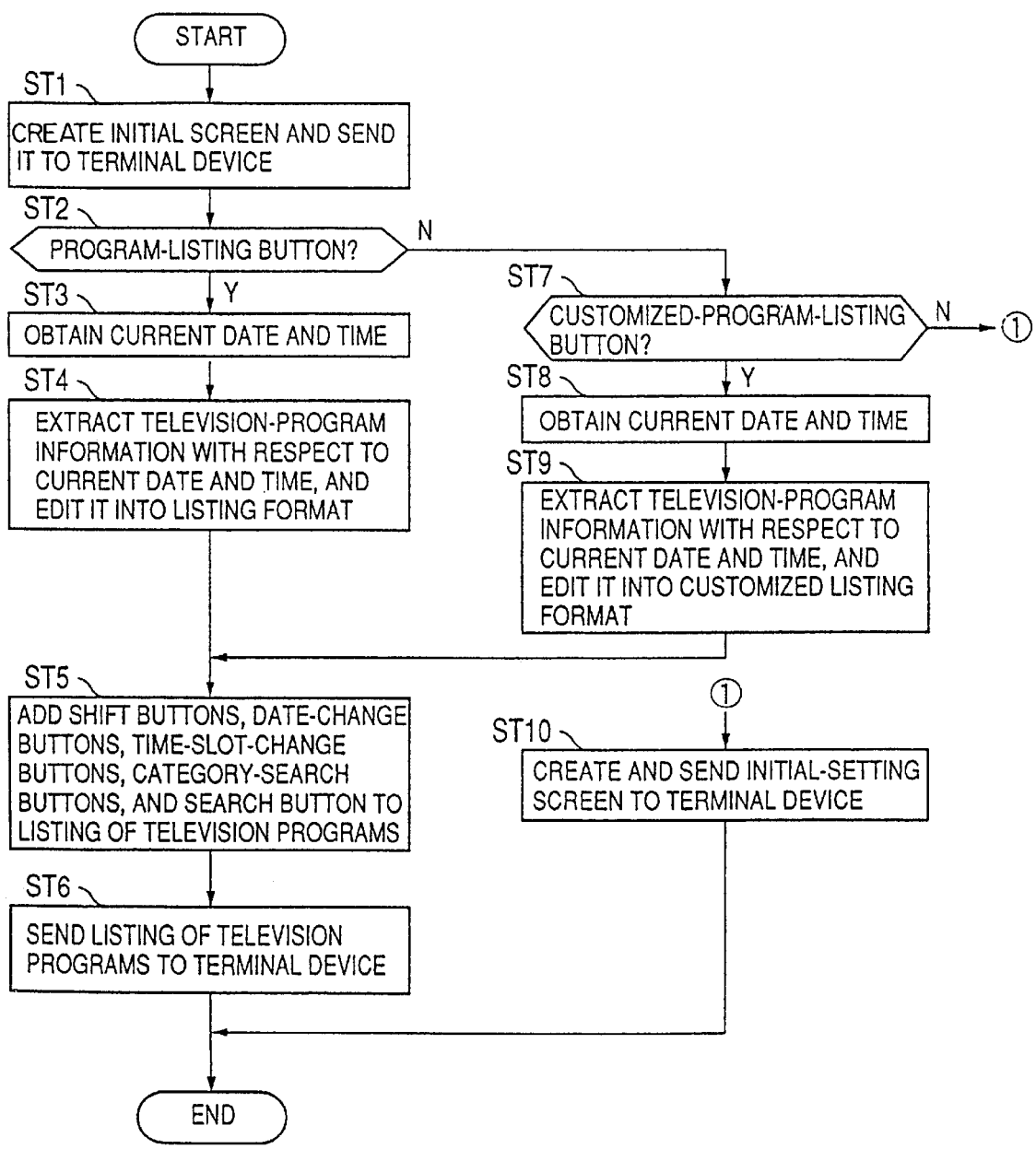
FIG. 6 is a flowchart of a process of the broadcast-program-information supplying program of FIG. 3.

FIG. 6 is a flowchart of a process of the broadcast-program-information supplying program 300. In the following, the present invention will be described in detail with reference to this flowchart.

At a step ST1, upon an activation request from a user operating the personal computer 34, the broadcast-program-information supplying program 300 creates an initial screen and sends it to the personal computer (terminal device) 34, so that the initial screen is displayed on the monitor display 35 of the personal computer 34.

Figure 7:
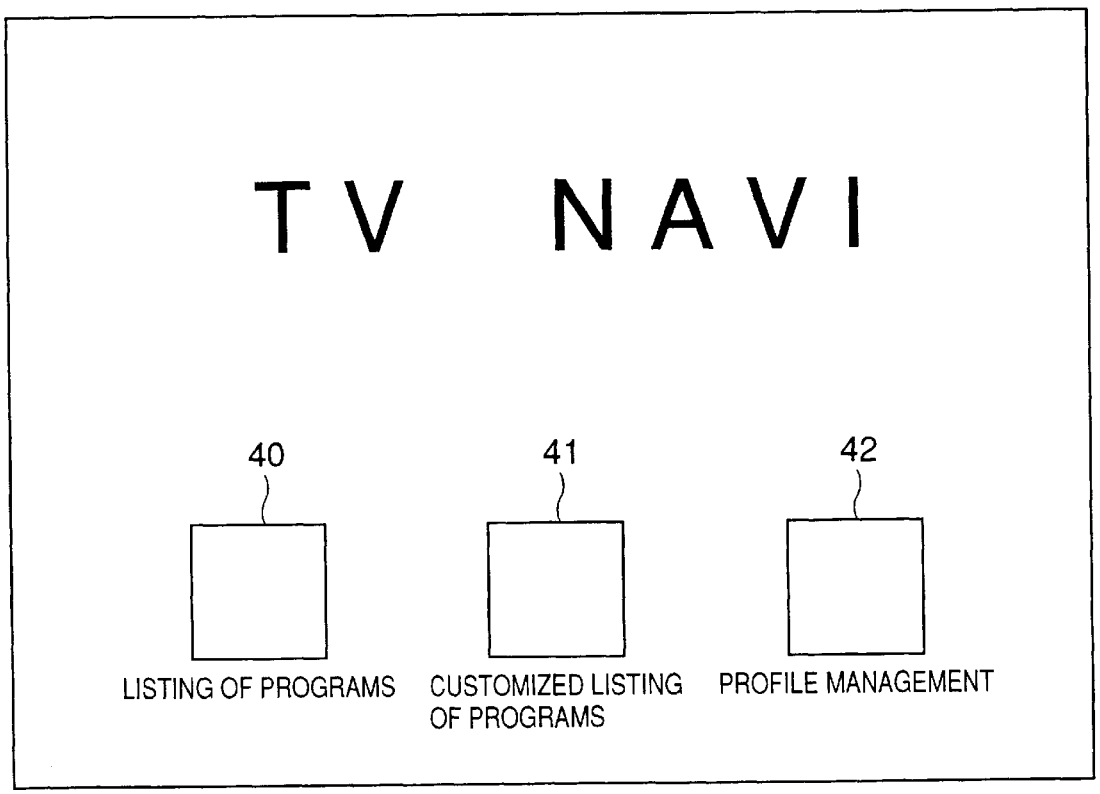
FIG. 7 is an illustrative drawing showing an example of an initial screen.

FIG. 7 is an illustrative drawing showing an example of the initial screen. As shown in figure, the initial screen includes a program-listing button 40, a customized-program-listing button 41, and a profile-management button 42. These buttons have an assigned URL (a symbol indicating a place of a resource in the Internet 33) in connection with the broadcast-program-information supplying program 300. When the user operates these buttons, operations on these buttons are sent to the broadcast-program-information supplying program 300 so that the broadcast-program-information supplying program 300 is informed of these operations.

At a step ST2, the broadcast-program-information supplying program 300 checks whether an operation is made by the user on the program-listing button 40. If it is, the procedure goes to a step ST3. Otherwise, the procedure goes to a step ST7.

At the step ST3, the broadcast-program-information supplying program 300 obtains a current date and time.

At a step ST4, the broadcast-program-information supplying program 300 extracts television-program information from the program database 31 with respect to the current date and time, and edits the extracted information into a listing format.

At a step ST5, the broadcast-program-information supplying program 300 adds shift buttons, date-change buttons, time-slot-change buttons, category-search buttons, and a search button to the listing of television programs so as to create a screen of the listing of television programs.

At a step ST6, the broadcast-program-information supplying program 300 sends the screen of a listing of television programs to the personal computer 34, so that the monitor display 35 of the personal computer 34 displays the listing of television programs.

Figure 8:
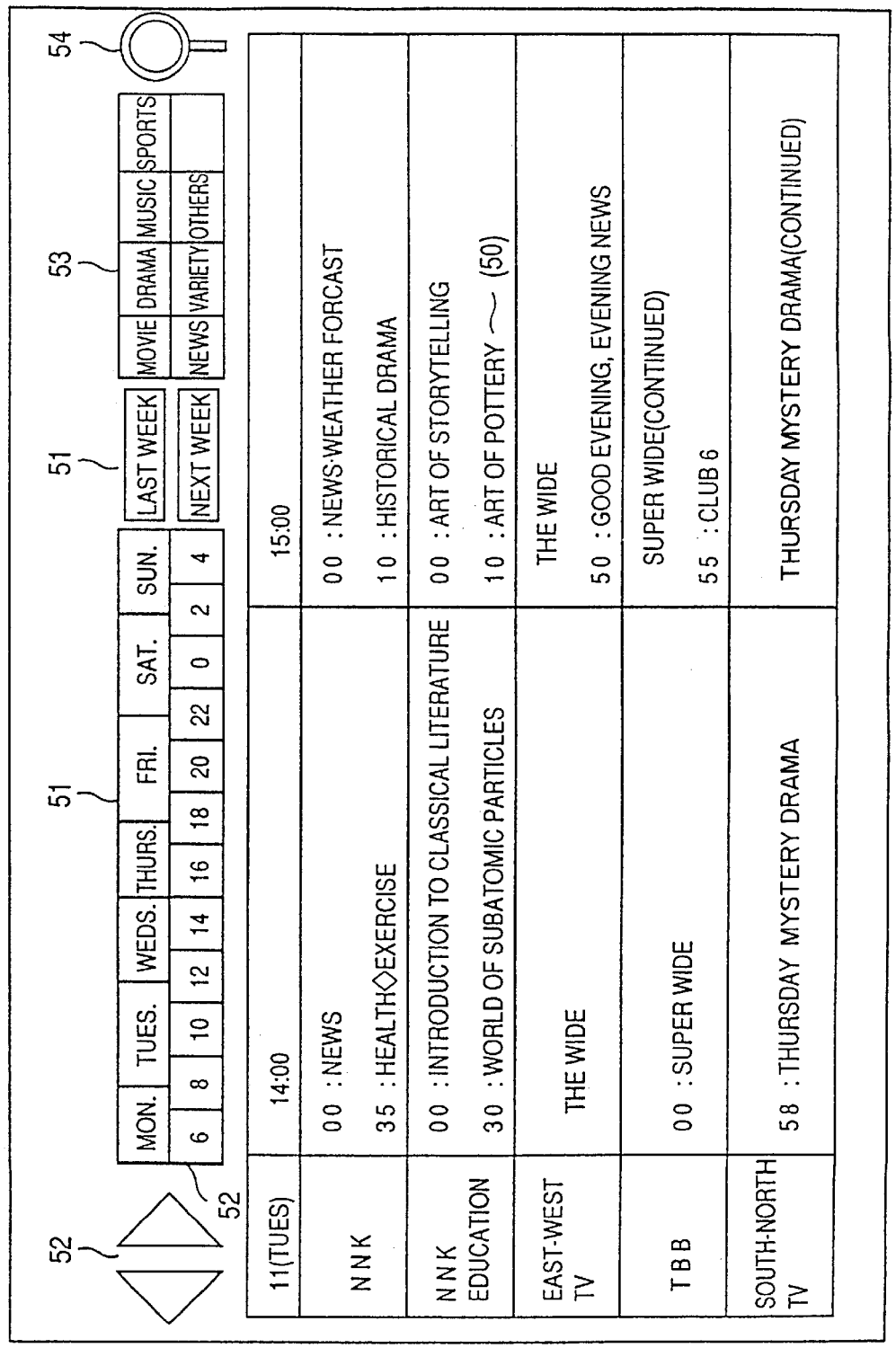
FIG. 8 is an illustrative drawing showing an exemplary screen of a listing of television programs which is created after the broadcast-program-information supplying program edits information into a listing format and adds buttons.

FIG. 8 is an illustrative drawing showing an exemplary screen of a listing of television programs which is created after the broadcast-program-information supplying program 300 edits the information into a listing format and adds the buttons. As shown in the figure, the screen of a listing of television programs shows television programs in a table format which are aired by each television station on the indicated date during a time slot of the indicated time.

As shown in FIG. 8, the screen of a listing of television programs includes shift buttons 50, date-change buttons 51, time-slot-change buttons 52, category-search buttons 53, and a search button 54. The shift buttons 50 are provided for respective television programs (only one shift button is shown in the figure for the sake of clarity), and are used for giving an instruction to display a screen which shows details of the selected television program. The date-change buttons 51 are used for issuing an instruction to change the date of displayed information, and include change buttons for changing the date by one week and other change buttons for changing the day. The time-slot-change buttons 52 are used for giving an instruction to change the displayed time slot, and includes change buttons for changing the time slot by a unit of two hours. The category-search buttons 53 are provided for respective television-program categories, and are used for issuing an instruction to search for television programs classified in a selected category. The search button 54 is used for giving an instruction to search for television programs. These buttons have an assigned URL in connection with the broadcast-program-information supplying program 300.

With reference to FIG. 6 again, at the step ST7, when it turns out at the step ST2 that the button operated by the user is not the program-listing button 40, the broadcast-program-information supplying program 300 checks whether the button operated by the user is the customized-program-listing button 41. If it is, the procedure goes to a step ST8. Otherwise, the procedure goes to a step ST10.

At the step ST8, the broadcast-program-information supplying program 300 obtains a current date and time.

At the step ST9, the broadcast-program-information supplying program 300 extracts television-program information from the program database 31 with respect to the current date and time, and edits the extracted information into a customized listing format in accordance with the customized-program-listing instruction.

The customized-program-listing instruction is used for displaying a listing of television programs with contents which are customized by the user. As will be described later, a selection of contents are made by the user interactively operating a setting screen, which is displayed upon a selection of the profile-management button 42.

At the step ST5 following the step ST9, the broadcast-program-information supplying program 300 adds the shift buttons 50, the date-change buttons 51, the time-slot-change buttons 52, the category-search buttons 53, and the search button 54 so as to create a screen of a customized listing of television programs.

At the step ST6, the broadcast-program-information supplying program 300 sends the screen of a customized listing of television programs to the personal computer 34, so that the monitor display 35 of the personal computer 34 displays the customized listing of television programs.

At the step ST10, when it turns out at the step ST7 that the button operated by the user is not the customized-program-listing button 41, i.e., when it is found that the operated button is the profile-management button 42, the broadcast-program-information supplying program 300 creates and sends an initial-setting screen to the personal computer 34, so that the monitor display 35 of the personal computer 34 displays the initial-setting screen.

FIG. 9 is an illustrative drawing showing an example of the initial-setting screen. As shown in the figure, the initial-setting screen includes a standard button 60 and modify buttons 61 through 63. The standard button 60 is used for issuing an instruction to assign channel numbers to television stations and decide an order of displayed television stations according to a standard format. The modify button 61 is used for giving an instruction to assign non-standard channel numbers to the television stations and change an order of the displayed television stations. The modify button 62 is used for making a request to change customized categories, customized time, and a start-up screen. The modify button 63 is used for issuing a request to change a password. A URL is assigned to each of these buttons in connection with the broadcast-program-information supplying program 300.

In this manner, the broadcast-program-information supplying program 300, upon an activation request from the user, carries out the process shown in the flowchart of FIG. 6 so as to create a screen of a listing of television programs which are aired by each television station on the current date and time. The created screen of the listing of television programs is displayed on the monitor display 35 of the personal computer 34. Alternately, a screen of a customized listing of television programs may be created and displayed on the monitor display 35 of the personal computer 34.

Figure 10A:
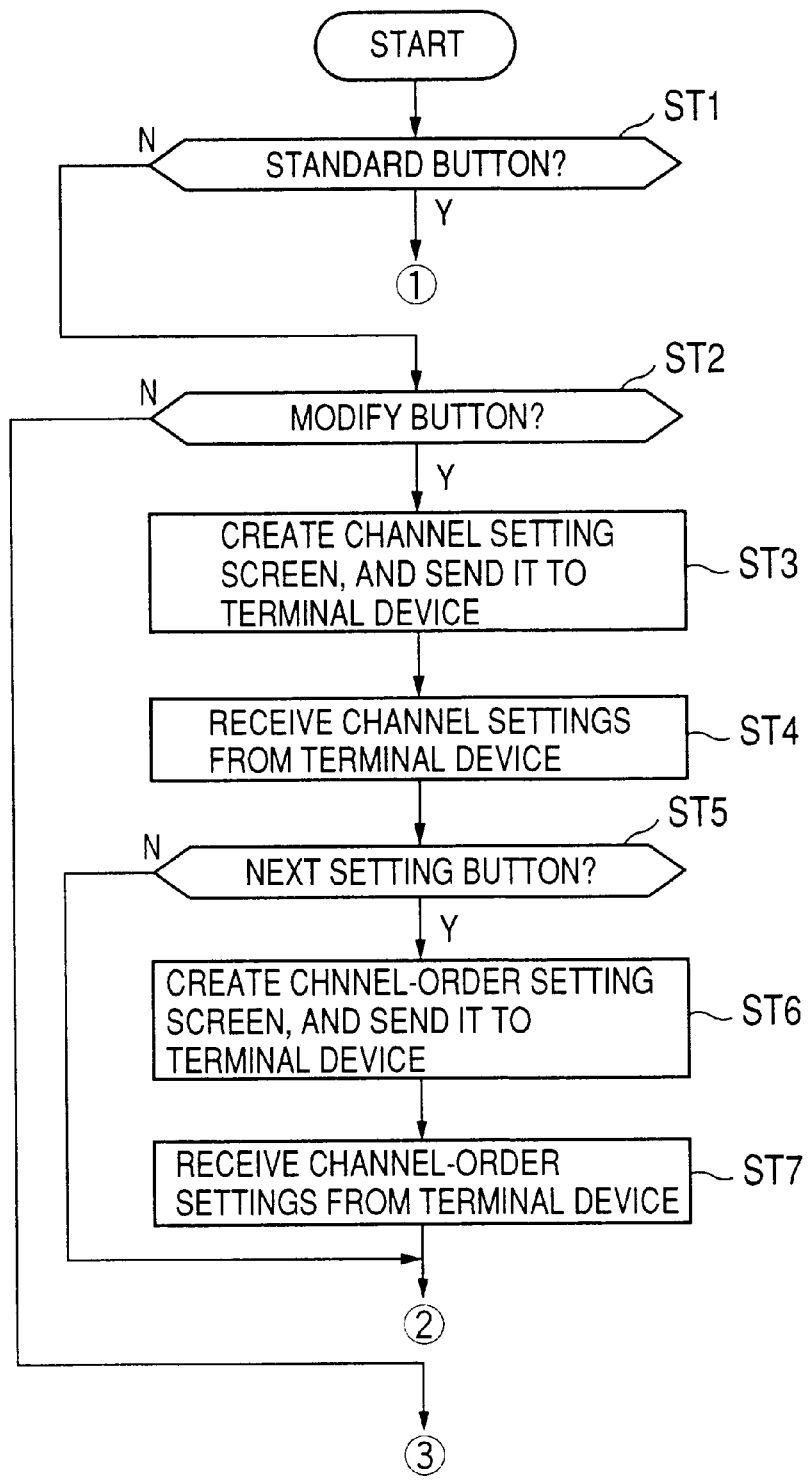
FIGS. 10A and 10B are a flowchart of a process carried out by the broadcast-program-information supplying program when the initial-setting screen of FIG. 9 is displayed on a monitor display.
Figure 10B:
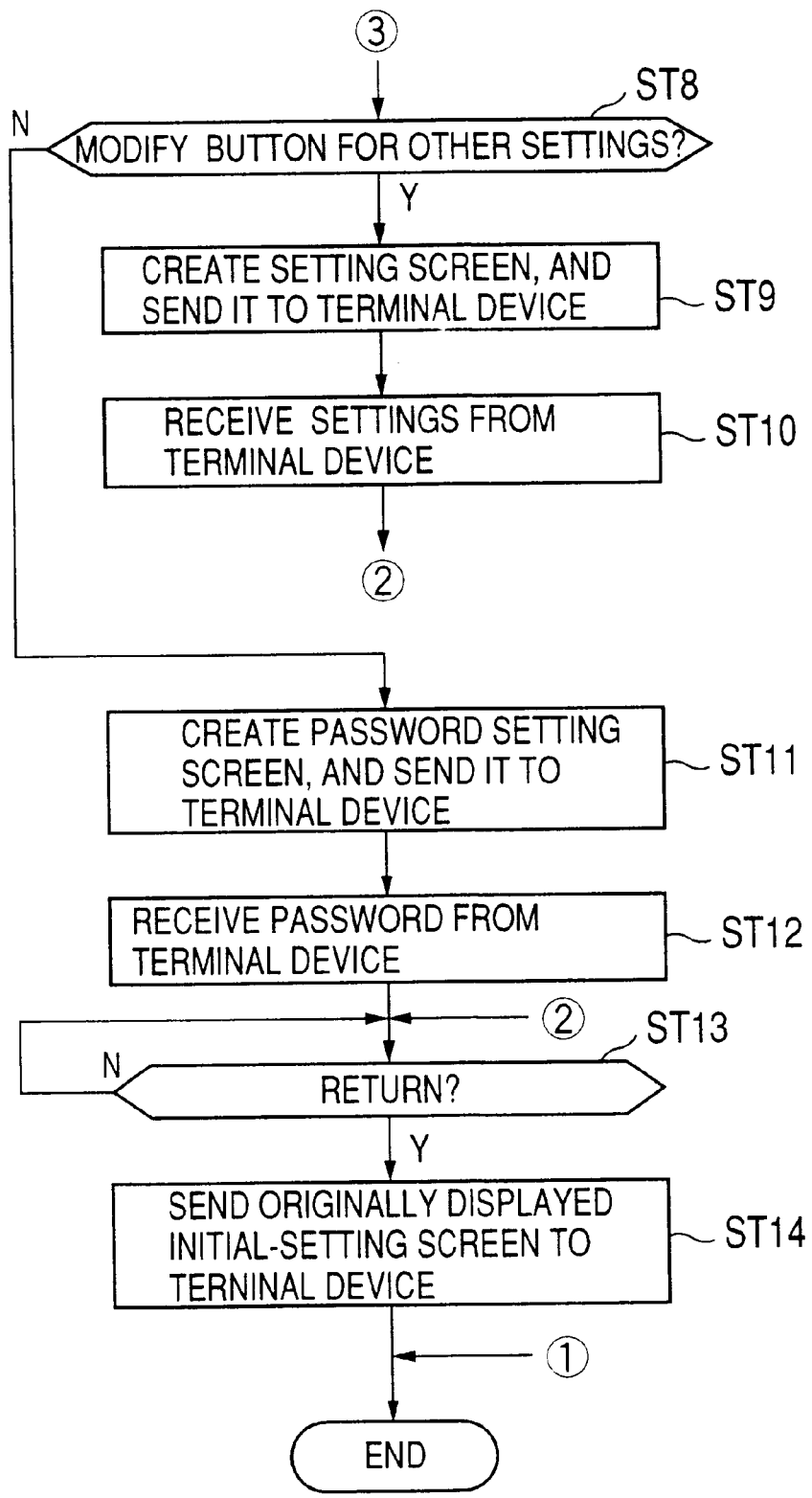

FIGS. 10A and 10B are a flowchart of a process carried out by the broadcast-program-information supplying program 300 when the initial-setting screen of FIG. 9 is displayed on the monitor display 35. This process will be described below with reference to FIGS. 10A and 10B.

At a step ST1, upon a user operation on a button when an initial-setting screen is displayed on the monitor display 35 of the personal computer 34, the broadcast-program-information supplying program 300 checks whether the operated button is the standard button 60 (which is used for giving an instruction to assign channel numbers to television stations and decide an order of displayed television stations according to a standard format). If it is, the procedure ends because the use of the available standard format requires no further instructions from the user. If the operated button is not the standard button 60, the procedure goes to a step ST2.

At the step ST2, broadcast-program-information supplying program 300 checks whether the operated button is the modify button 61 (which is used for assigning non-standard channel numbers to television stations and displaying the television stations in a customized order). If it is, the procedure goes to a step ST3. Otherwise, the procedure goes to a step ST8.

At the step ST3, the broadcast-program-information supplying program 300 creates a channel setting screen used for assigning channel numbers to television stations, and sends it to the personal computer 34 so that the personal computer 34 displays the channel setting screen on the monitor display 35. FIG. 11 is an illustrative drawing showing an example of the channel setting screen.

At a step ST4, the broadcast-program-information supplying program 300 receives channel settings from the personal computer 34 when the user selects a channel number with respect to each television station on the channel setting screen.

At a step ST5, the broadcast-program-information supplying program 300 checks whether a next setting button on the channel setting screen is operated, thereby checking whether an instruction is given to modify an order of displayed television stations. If it is, the procedure goes to a step ST6. Otherwise, the procedure goes to a step ST13.

At the step ST6, the broadcast-program-information supplying program 300 creates a channel-order setting screen used for setting an order of displayed television stations, and sends it to the personal computer 34 so that the personal computer 34 displays the channel-order setting screen on the monitor display 35. FIG. 12 is an illustrative drawing showing an example of the channel-order setting screen.

At a step ST7, the broadcast-program-information supplying program 300 receives channel-order settings from the personal computer 34 when the user enters channel orders into the channel-order setting screen. Here, according to the configuration of this embodiment, a given television station is not displayed when no channel order is provided for this television station.

At the step ST13, following the step ST7 or when it is found at the step ST5 that no instruction to modify the order of displayed television stations is given, the broadcast-program-information supplying program 300 checks whether a return button on the channel setting screen or the channel-order setting screen is operated. If it is, the procedure goes to a step ST14. Otherwise, the procedure comes back to the step ST13 so as to wait until the return button is selected.

At the step ST14, the broadcast-program-information supplying program 300 sends the initial-setting screen originally displayed to the personal computer 34, so that the monitor display 35 of the personal computer 34 displays the initial-setting screen as it was displayed before.

At the step ST8, when it turns out at the step ST2 that the operated button is not the modify button 61, the broadcast-program-information supplying program 300 checks whether the operated button is the modify button 62 (which is used for modifying customized categories, customized time slots, or a start-up screen). If it is, the procedure goes to a step ST9. Otherwise, the procedure goes to a step ST11.

At the step ST9, the broadcast-program-information supplying program 300 creates a setting screen which is used for setting customized categories (only the television programs falling into these categories will be displayed on a listing of television programs), customized time slots (only the television programs in these time slots will be displayed on a listing of television programs), and a start-up screen (this start-up screen will be displayed at the time of starting up). The broadcast-program-information supplying program 300 sends the setting screen to the personal computer 34 so that the personal computer 34 displays the setting screen on the monitor display 35. FIG. 13 is an illustrative drawing showing an example of the setting screen.

At a step ST10, the broadcast-program-information supplying program 300 receives settings from the personal computer 34 when the user enters these settings through the setting screen.

At the step ST13 following the step ST10, the broadcast-program-information supplying program 300 checks whether a return button on the setting screen is operated. If it is, the procedure goes to the step ST14. Otherwise, the procedure comes back to the step ST13 so as to wait until the return button is selected.

At the step ST14, the broadcast-program-information supplying program 300 sends the initial-setting screen originally displayed to the personal computer 34, so that the monitor display 35 of the personal computer 34 displays the initial-setting screen as it was displayed before.

At a step ST11, when it is found at the step ST8 that the operated button is not the modify button 62, and, thus, should be the modify button 63 (used for modifying a password), the broadcast-program-information supplying program 300 creates a password setting screen used for setting a password, and sends it to the personal computer 34 so that the personal computer 34 displays the password setting screen on the monitor display 35. FIG. 14 is an illustrative drawing showing an example of the password setting screen.

At the step ST12, the broadcast-program-information supplying program 300 receives a password when the user enters the password into the password setting screen.

At the step ST13 following the step ST12, the broadcast-program-information supplying program 300 checks whether a return button (an OK button or a CANCEL button) on the password setting screen is operated. If it is, the procedure goes to the step ST14. Otherwise, the procedure comes back to the step ST13 so as to wait until the return button is selected.

At the step ST14, the broadcast-program-information supplying program 300 sends the initial-setting screen originally displayed to the personal computer 34, so that the monitor display 35 of the personal computer 34 displays the initial-setting screen as it was displayed before.

In this manner, upon a user operation on a button when the initial-setting screen as shown in FIG. 9 is displayed on the monitor display 35 of the personal computer 34, the broadcast-program-information supplying program 300 carries out the process of the flowchart of FIGS. 10A and 10B so as to obtain setting information necessary for creating a requested listing of television programs.

As described above, when the broadcast-program-information supplying program 300 detects a user operation on the customized-program-listing button 41 when the initial screen as shown in FIG. 7 is on display, the broadcast-program-information supplying program 300 creates a customized listing of television programs in accordance with the setting information described above, so as to let the personal computer 34 display the customized listing on the monitor display 35.

Figure 15A:
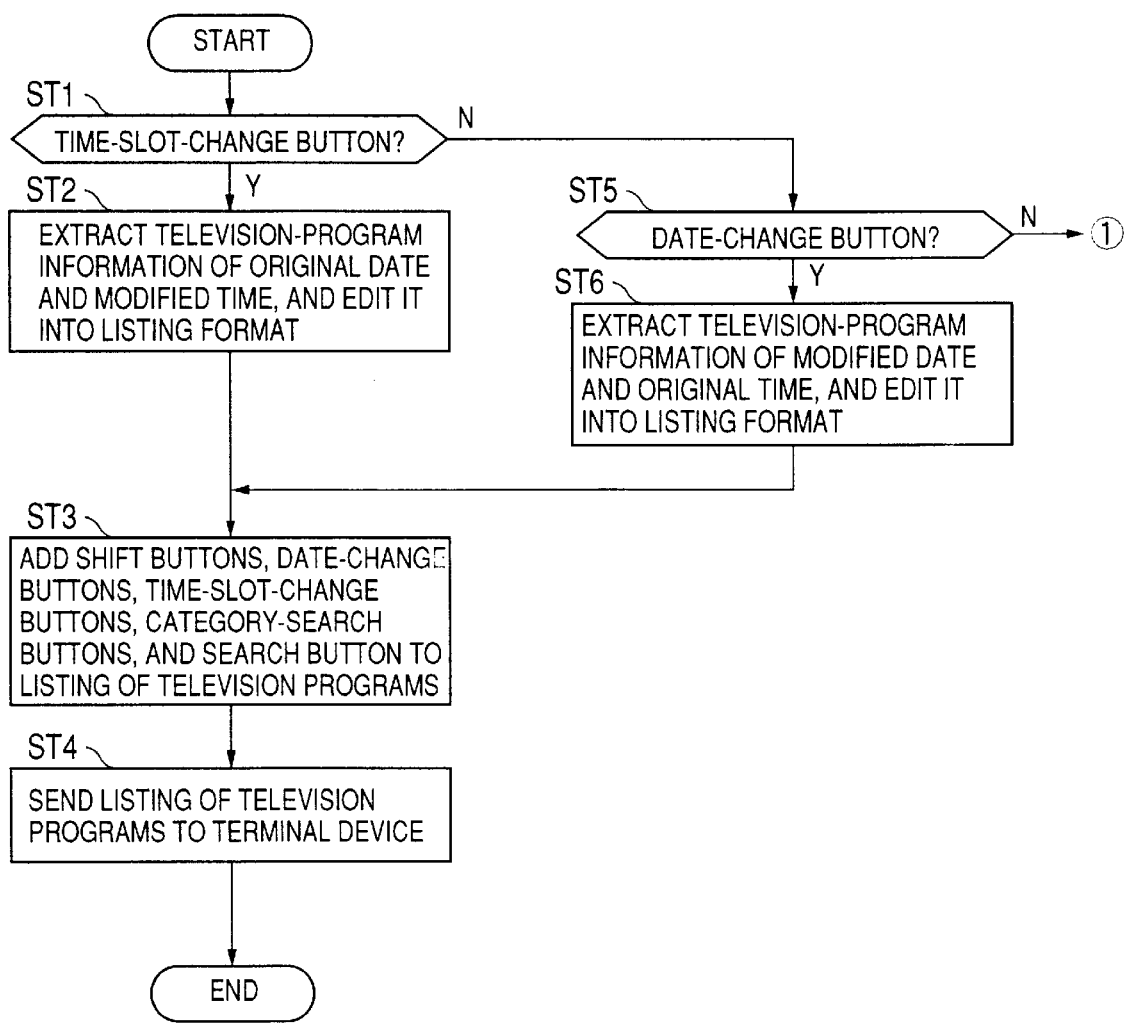
FIGS. 15A through 15C are a flowchart of a process which is carried out by the broadcast-program-information supplying program when a listing of television programs is displayed on the monitor display.
Figure 15B:
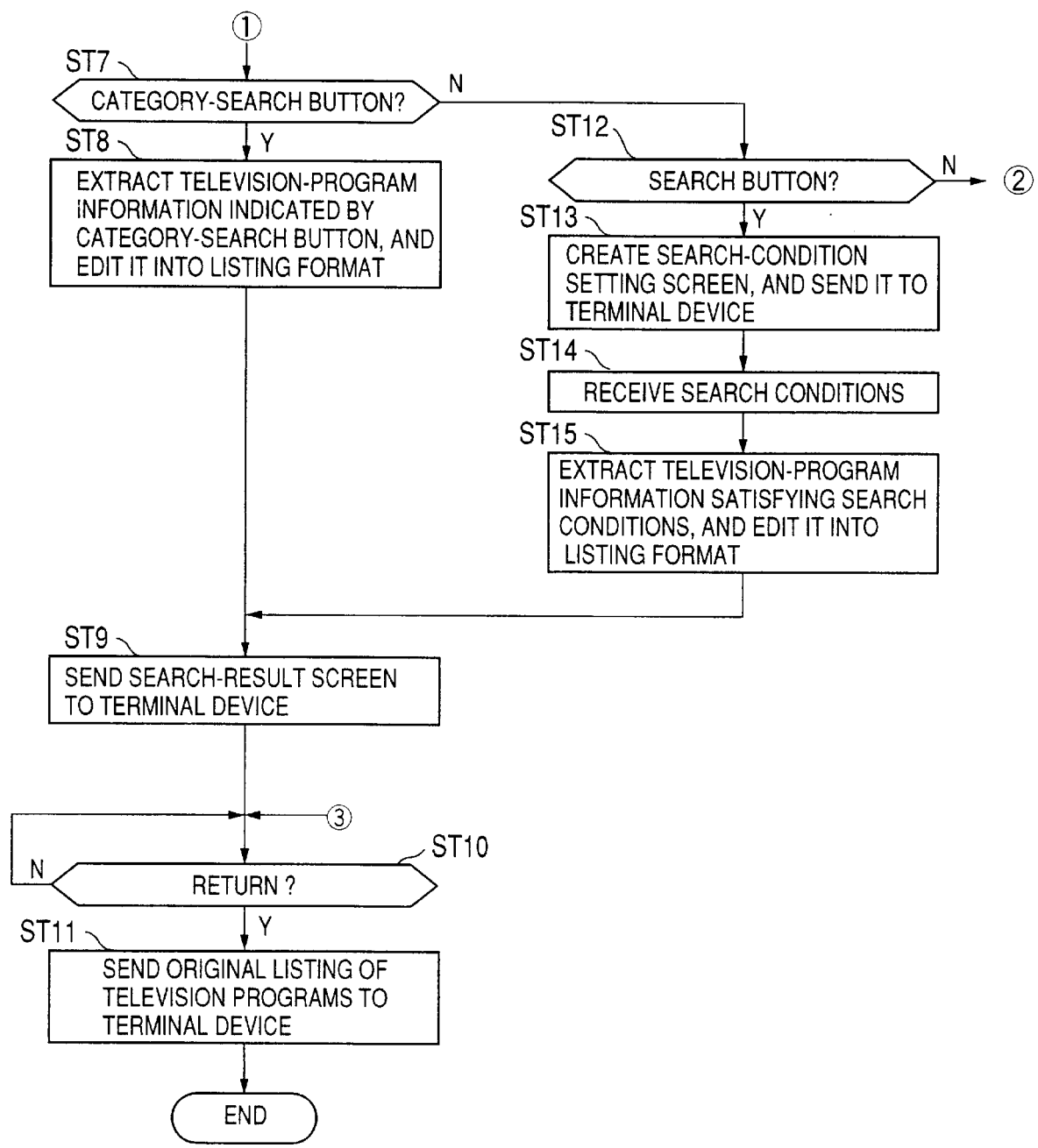
Figure 15C:
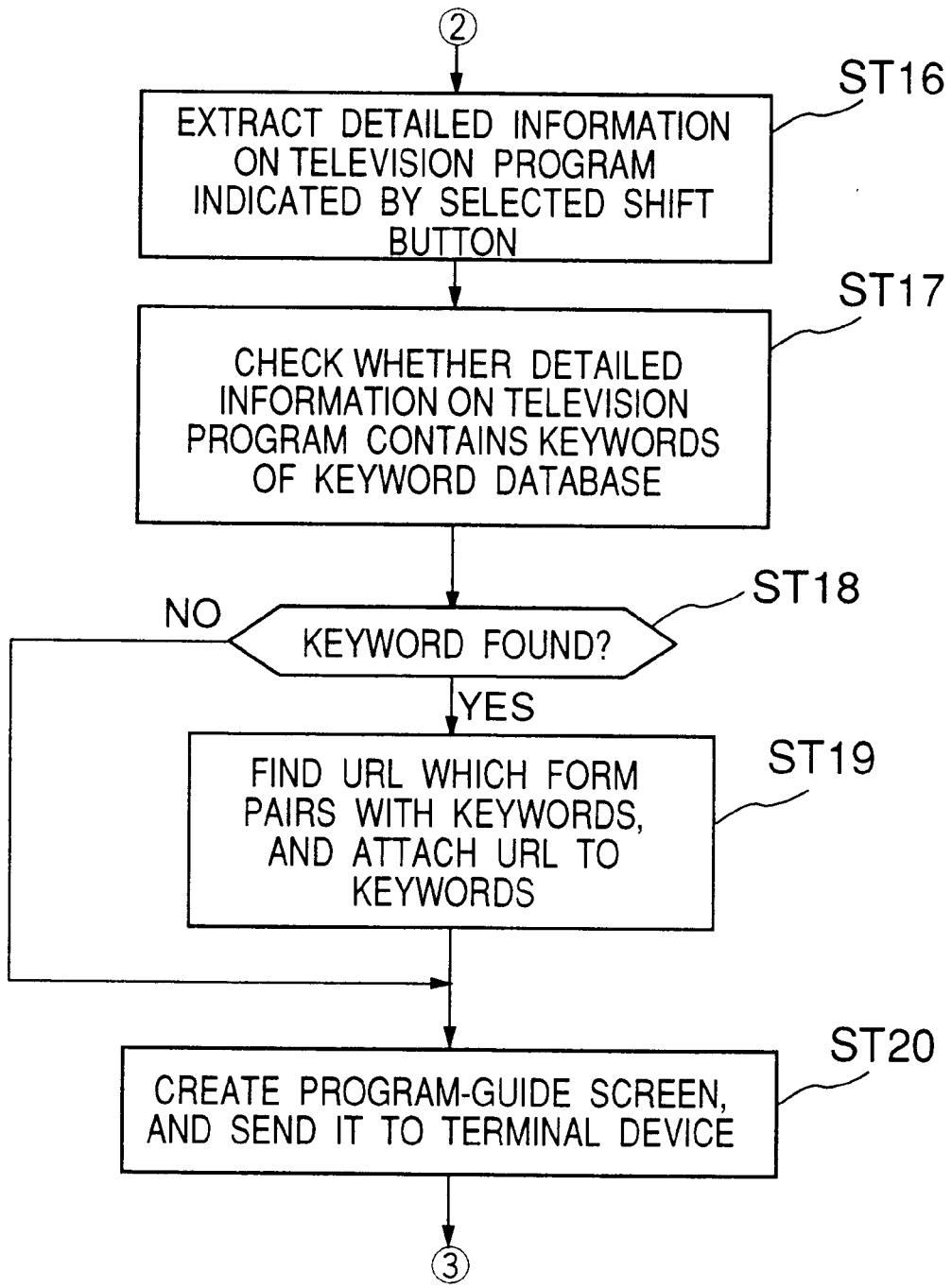

FIGS. 15A through 15C are a flowchart of a process which is carried out by the broadcast-program-information supplying program 300 when a listing of television programs (such as shown in FIG. 8) is displayed on the monitor display 35. This process will be described below with reference to FIGS. 15A through 15C.

At a step ST1, upon a user operation on a button when a listing of the television programs is displayed on the monitor display 35 of the personal computer 34, the broadcast-program-information supplying program 300 checks whether the operated button is one of the time-slot-change buttons 52. If it is, the procedure goes to a step ST2. Otherwise, the procedure goes to a step ST5.

At the step ST2, the broadcast-program-information supplying program 300 extracts the television-program information of an original date and modified time from the program database 31, and edits the information into a listing format.

At a step ST3, the broadcast-program-information supplying program 300 adds the shift buttons 50, the date-change buttons 51, the time-slot-change buttons 52, the category-search buttons 53, and the search button 54 to the listing of television programs of each television station so as to create a screen of a listing of television programs.

At a step ST4, the broadcast-program-information supplying program 300 sends the screen of a listing of television programs to the personal computer 34, so that the monitor display 35 of the personal computer 34 displays the listing of television programs in accordance with the request.

In this manner, operating the time-slot-change buttons 52, the user can obtain a listing of television programs with respect to a time period in which the user wishes to watch television.

At the step ST5, when it is found at the step ST1 that the button operated by the user is not the time-slot-change buttons 52, the broadcast-program-information supplying program 300 checks whether the operated button is one of the date-change buttons 51. If it is, the procedure goes to a step ST6. Otherwise, the procedure goes to a step ST7 (FIG. 15B).

At the step ST6, the broadcast-program-information supplying program 300 extracts the television-program information of a modified date and original time from the program database 31, and edits the information into a listing format.

At the step ST3 following the step ST6, the broadcast-program-information supplying program 300 adds the shift buttons 50, the date-change buttons 51, the time-slot-change buttons 52, the category-search buttons 53, and the search button 54 to the listing of television programs of each television station so as to create a screen of a listing of television programs.

At the step ST4, the broadcast-program-information supplying program 300 sends the screen of a listing of television programs to the personal computer 34, so that the monitor display 35 of the personal computer 34 displays the listing of television programs in accordance with the request.

In this manner, operating the date-change buttons 51, the user can obtain a listing of television programs with respect to a desired date.

At the step ST7 (FIG. 15B), when it is found at the step ST5 that the button operated by the user is not the date-change buttons 51, the broadcast-program-information supplying program 300 checks whether the operated button is one of the category-search buttons 53. If it is, the procedure goes to a step ST8. Otherwise, the procedure goes to a step ST12.

At the step ST8, the broadcast-program-information supplying program 300 extracts the television-program information from the program database 31 such that television programs of the extracted information fall into a category indicated by the selected one of the category-search buttons 53, and edits the extracted information into a predetermined listing format to create a search-result screen.

At a step ST9, the broadcast-program-information supplying program 300 sends the search-result screen to the personal computer 34, so that the monitor display 35 of the personal computer 34 displays the search-result screen which lists the television programs falling into the requested program category.

At a step ST10, the broadcast-program-information supplying program 300 checks whether a return button on the search-result screen is clicked. If it is, the procedure goes to a step ST11. Otherwise, the procedure comes back to the step ST10 so as to wait until the return button is operated.

At the step ST11, the broadcast-program-information supplying program 300 sends the original screen of a listing of television programs to the personal computer 34, so that the monitor display 35 of the personal computer 34 displays the original listing of television programs.

In this manner, if the user wishes to look through information about drama programs, for example, the user can obtain a listing of drama programs by operating one of the category-search buttons 53 which is provided for searching drama programs. FIG. 16 is an illustrative drawing showing an example of a listing of drama programs.

At the step ST12, when it is found at the step ST7 that the button operated by the user is not the category-search buttons 53, the broadcast-program-information supplying program 300 checks whether the operated button is the search button 54. If it is, the procedure goes to a step ST13. Otherwise, the procedure goes to a step ST16 (FIG. 15C).

At the step ST13, the broadcast-program-information supplying program 300 creates a search-condition setting screen, and sends it to the personal computer 34, so that the monitor display 35 of the personal computer 34 displays the search-condition setting screen.

FIG. 17 is an illustrative drawing showing an example of the search-condition setting screen. As shown in the figure, the search-condition setting screen includes a field for setting a time span for a search, a field for setting a time slot for a search, a field for setting a program category to be searched for, and a field for setting one or more television stations to be included in a search.

At a step ST14 following the step ST13, the broadcast-program-information supplying program 300 receives data of search conditions entered through the search-condition setting screen.

At a step ST15, the broadcast-program-information supplying program 300 extracts the television-program information from the program database 31 such that television programs of the extracted information satisfies the received search conditions, and edits the extracted information into a predetermined listing format to create a search-result screen.

At the step ST9 following the step ST15, the broadcast-program-information supplying program 300 sends the search-result screen to the personal computer 34, so that the monitor display 35 of the personal computer 34 displays the search-result screen which lists the television programs which the user wishes to watch.

At the step ST10, the broadcast-program-information supplying program 300 checks whether a return button on the search-result screen is clicked. If it is, the procedure goes to the step ST11. Otherwise, the procedure comes back to the step ST10 so as to wait until the return button is operated.

At the step ST11, the broadcast-program-information supplying program 300 sends the original screen of a listing of television programs to the personal computer 34, so that the monitor display 35 of the personal computer 34 displays the original listing of television programs.

In this manner, the user can obtain a listing of television programs which the user wishes to watch by operating the search button 54 and entering search conditions through the search-condition setting screen to search for the listing of television programs which satisfy the entered search conditions. FIG. 16 shows an example of such a listing of television programs.

At the step ST16, when it is found at the step ST12 that the button operated by the user is not the search button 54 and, thus, should be one of the shift buttons 50, the broadcast-program-information supplying program 300 extracts detailed information on a television program indicated by the selected one of the shift buttons 50 from the program database 31.

At a step ST17, the broadcast-program-information supplying program 300 checks whether the detailed information on the television program contains some of the keywords which are registered in the keyword database 32 by looking up the keyword database 32.

At a step ST18, the broadcast-program-information supplying program 300 selects a next step based on the results of the check. If some of the keywords are found in the detailed information on the television program, the procedure goes to a step ST19. Otherwise, the procedure goes to a step ST20 by skipping the step ST19.

At the step ST19, the broadcast-program-information supplying program 300 looks up the keyword database 32 to find respective URLs which form pairs with the keywords, and attaches these URLs to the keywords in the detailed information on the television program.

At the step ST20, the broadcast-program-information supplying program 300 creates a program-guide screen based on the detailed information on the television program (which includes the attached URLs when there are relevant keywords). Further, the broadcast-program-information supplying program 300 sends the program-guide screen to the personal computer 34 so that the personal computer 34 displays the program-guide screen on the monitor display 35. FIG. 18 is an illustrative drawing showing an example of the program-guide screen.

In this manner, upon a user operation on a button when a listing of television programs as shown in FIG. 8 is displayed on the monitor display 35 of the personal computer 34, the broadcast-program-information supplying program 300 carries out the flowchart of FIGS. 15A through 15C. By doing so, the broadcast-program-information supplying program 300 can display a listing of television programs of a desired date, a listing of television programs of a desired time slot, a listing of television programs of a desired category obtained by a search, a listing of desired television programs obtained by a search, or a detailed program guide to a desired television program.

As shown in the flowchart of FIGS. 15A through 15C, the broadcast-program-information supplying program 300 attaches URLs to keywords in the detailed information on the television programs when these keywords are registered in the keyword database 32. These attached URLs are extracted from the keyword database 32, in which URL-keyword pairs are stored to provide one-to-one relationships between URLs and keywords.

Figure 19:
FIG. 19 is an illustrative drawing showing an example of screen data and a screen which is displayed by using this screen data.

FIG. 19 is an illustrative drawing showing an example of screen data and a screen which is displayed by using the screen data. As shown in FIG. 19, when a keyword "NNK" in detailed information on a television program is one of the keywords in the keyword database 32, a NNK's URL "http://www.nnk.or.jp/" is extracted from the keyword database 32, and is attached to the keyword "NNK" in the detailed information on the television program.

Since the keyword is provided with the corresponding URL, the keyword on the program-guide screen functions as a button. Typically, such a keyword is displayed in an enhanced appearance by underlining the keyword, for example. An enhanced appearance of a keyword tells the user that this keyword functions as a button for accessing a relevant information source via the Internet 33. Upon selecting an underlined keyword by a mouse click or the like, the user can access via the Internet 33 to an information source, which has an address indicated by the attached URL.

Figure 20:
FIG. 20 is an illustrative drawing for explaining an operation of obtaining a detailed-program guide and an operation of accessing an information source via a keyword.

FIG. 20 is an illustrative drawing for explaining an operation of obtaining a detailed-program guide and an operation of accessing an information source via a keyword. A user is first provided with a listing of television programs as shown on the left-hand side of the figure. When a user wishes to obtain detailed information on a television program "Ms REIKO'S DENTIST", the user operates the shift button 50 attached to the program "Ms REIKO'S DENTIST". Upon the operation, a detailed-program guide as shown on the right-hand side of the figure is displayed on the monitor display 35. In this example, a keyword "marriage" in the detailed-program guide is provided with a URL of an information source, and this information source provides reference information on places for holding wedding ceremonies. By operating a button superimposed on the keyword, the user can access to this information source to receive reference-information services with regard to places for wedding ceremonies.

Figure 21:
FIG. 21 is an illustrative drawing showing a prior-art screen data and a screen which is displayed by using this prior-art screen data.

FIG. 21 is an illustrative drawing showing a prior-art screen data and a screen which is displayed by using the prior-art screen data. As shown in FIG. 21, the prior-art screen data of the detailed-program guide contains only the text data of the detailed information on the television program. In such a configuration, even when the word "marriage" on the detailed-program guide arouses the user's interest, it is not easy for the user to receive reference-information services with regard to places for wedding ceremonies.

The above embodiment has described the configuration in which URLs are attached to program-guide information about a television program. In addition or alternately, URLs may be attached to a listing of television programs. Further, it is apparent that the present invention can be applied to radio-program services instead of the television-program services. Furthermore, the Internet 33 is not the only way of communications, but various communication systems such as an analog network, a digital network, a telephone network, a radio-wave system, etc., can be used in the present invention.

Although the present invention have been described with reference to a particular embodiment, this embodiment is not intended to limit the scope of the present invention. Namely, the present invention is not limited to a case in which the internet server 30 transmits listings of broadcast programs to the personal computer 34 via the Internet 33.

Transmission of any information, even if this information does not relate to broadcast programs, may benefit from the use of the present invention. That is, when keywords in the keyword database 32 can be found in transmitted information, corresponding addresses of information sources stored in the keyword database 32 may be attached to the keywords in the transmitted information.

In such a configuration, while looking through information displayed on the monitor display 35, a user can operate a button associated with a particular keyword so as to access an information source relevant to this keyword.

Further, the above embodiment has been described with reference to the configuration in which addresses of information sources are attached to keywords. It is apparent that addresses of information sources can be attached to images (pictures) in transmitted information to achieve the same objectives. Such a configuration is readily implemented by storing one-to-one relationships between addresses and images in the keyword database 32.

In this configuration, while looking through information displayed on the monitor display 35, a user can operate a button associated with a particular image so as to access an information source relevant to this image.

Further, the keyword database 32 may store file names or the like of its own system in addition to addresses of other information sources.

In this configuration, while looking through information displayed on the monitor display 35, a user can operate a button associated with a particular keyword (image) so as to access information relevant to this keyword (image) stored in the same cite from which the user is currently receiving services.

Significant advantages can be obtained when the present invention is applied to a device having a document-creation function and connected to the Internet 33. Such a device is used for creating documents comprised of text and images to send the created documents to other devices via the Internet 33. The present invention can be applied to this device such that addresses of information sources are attached to the text and images of the created documents.

In this configuration, while looking through information provided from such a device, a user can operate a button associated with text or an image in this information so as to access information relevant to this text or image.

According to the present invention as described above, while receiving information services from a given information providing system, a user can readily obtain information from other information providing systems as such information becomes necessary.

Further, the present invention is not limited to these embodiments, but various variations and modifications may be made without departing from the scope of the present invention.

What is claimed is:

1. A broadcast-program information sending device for extracting information which a terminal device requests and sending said information, comprising:
   a keyword management unit storing correspondences between keywords and addresses of information sources which provide information relevant to respective ones of said keywords;
   a check unit that checks whether broadcast program information to be sent to a terminal device contains at least one of said keywords;
   an addition unit responding to an indication that a keyword is contained in said broadcast program information by
      looking up said correspondence stored in said keyword management unit, and
      attaching to said keyword an access button that specifies an address of a corresponding one of said information sources, said access button being used in said terminal device for accessing said corresponding information source; and
   a sending unit sending said broadcast program information including said attached access buttons to said terminal device.

2. The device as claimed in claim 1, further comprising:
   a broadcast-program management unit which stores information on broadcast programs;
   a shift-button addition unit attaching a shift button to a specified broadcast program appearing on a listing of broadcast programs sent to said terminal device, said shift button issuing a request for program-guide information on said specified broadcast program in response to selection of said shift button at said terminal device; and
   an extracting unit extracting said program guide information on said specified broadcast program from said broadcast-program management unit in response to said request,
   wherein said addition unit attaches a corresponding access button to each of said keywords found in said program-guide information.

3. The device as claimed in claim 2, further comprising a generation unit extracting information from said broadcast-program management unit with respect to broadcast programs of a date and time indicated by said terminal device, and editing said extracted information to generate said listing of broadcast programs.

4. The device as claimed in claim 1, wherein said network comprises an information service network, and said addresses of information sources comprise network addresses.

5. The device as claimed in claim 1, wherein said broadcast-program information comprises text and image data, and each of said keywords comprises one of predetermined text information and predetermined image information.

6. A device for extracting information which a terminal requests and sending said information, comprising:
   a keyword management unit storing correspondences between keywords and locations of information sources which provide information relevant to respective ones of said keywords;
   a check unit that checks whether a document contains at least one of said keywords; and
   an additional unit responding to an indication that a keyword is contained in said extracted information by
      looking up said correspondence stored in said keyword management unit, and
      attaching to said keyword an access button that specifies an address of a corresponding one of said information sources, said access button being used in said terminal device for accessing said corresponding information source.

7. The device as claimed in claim 6, further comprising an interface unit connected to a network, wherein said locations of said information sources comprise network addresses for information sources on said network and file locations for files stored in said device.

8. The device as claimed in claim 6, wherein said document comprises text and image data, and each of said keywords comprises one of predetermined text information and predetermined image information.

9. The device as claimed in claim 7, wherein said interface unit sends said document to a terminal device connected thereto via said network.

10. The device as claimed in claim 9, wherein for each of said keywords contained in said document, said access button is indicated by display of said keyword with an enhanced appearance within a display of said document by said terminal device on a display screen thereof.

11. The device as claimed in claim 9, wherein said network comprises an information service network.

12. The device as claimed in claim 9, wherein said document includes information on broadcast programs.

13. A method of sending information over a network, said method comprising the steps of:

extracting information which a terminal device requests;

storing correspondences between keywords and addresses of information sources which provide information relevant to respective ones of the keywords;

checking whether extracted information to be sent to a terminal device connected to the network contains at least one of the keywords;

responding to an indication that a keyword is contained in the information by looking up the correspondence for the contained keyword, and attaching to the contained keyword an access button that specifies an address of a corresponding information source, the access button being used in said terminal device for accessing said corresponding information source.

14. The method as claimed in claim 13, further comprising the steps of:

storing, in a database, information on broadcast programs;

extracting information from the database with respect to broadcast programs of a date and time indicated by the terminal device;

editing the extracted information to generate a listing of the broadcast programs for which the information was extracted;

attaching a shift button to broadcast a program appearing on the listing of broadcast programs, the shift button being used in the terminal device for issuing a request for program-guide information on the broadcast program in response to selection of the shift button;

sending the listing of broadcast programs to the terminal device; and extracting the program-guide information on the broadcast program from the database in response to the request, wherein the step of access-button attaching includes, for each of the keywords contained in the program-guide information on the broadcast program, attaching a corresponding access button to the keyword.

15. A hypertext document processing device for extracting a document from an information store responsive to a request from a terminal and sending a corresponding hypertext document to the terminal, said device comprising:

a check unit that checks whether the extracted document contains a keyword listed in a keyword list of keywords and corresponding information sources, the information sources linkable to a hypertext document corresponding to the extracted document; and a code insertion unit that inserts a hypertext code into the hypertext document when said check unit determines that the extracted document contains a keyword listed in the keyword list, the hypertext code providing a link between an occurrence of the keyword in the hypertext document and the information source corresponding to the keyword.

* * * * *